United States Patent
Movsisyan

(10) Patent No.: US 10,827,042 B2
(45) Date of Patent: Nov. 3, 2020

(54) TRAFFIC OPTIMIZATION FOR MULTI-NODE APPLICATIONS

(71) Applicant: VMware, Inc., Palo Alto, CA (US)

(72) Inventor: Vardan Movsisyan, Yerevan (AM)

(73) Assignee: VMWARE, INC., Palo Alto, CA (US)

( * ) Notice: Subject to any disclaimer, the term of this patent is extended or adjusted under 35 U.S.C. 154(b) by 283 days.

(21) Appl. No.: 15/484,049

(22) Filed: Apr. 10, 2017

(65) Prior Publication Data
US 2018/0295064 A1 Oct. 11, 2018

(51) Int. Cl.
*H04L 29/06* (2006.01)
*G06F 9/455* (2018.01)
*H04L 29/08* (2006.01)
*H04L 12/721* (2013.01)
*H04L 12/725* (2013.01)
*H04L 29/12* (2006.01)

(52) U.S. Cl.
CPC ............. *H04L 69/22* (2013.01); *G06F 9/455* (2013.01); *G06F 9/45558* (2013.01); *H04L 45/306* (2013.01); *H04L 45/70* (2013.01); *H04L 67/02* (2013.01); *H04L 67/18* (2013.01); *G06F 2009/4557* (2013.01); *G06F 2009/45595* (2013.01); *H04L 61/2521* (2013.01)

(58) Field of Classification Search
CPC ... G06F 2009/4557; G06F 2009/45595; G06F 9/455; G06F 9/45558; H04L 47/2475; H04L 61/2521; H04L 67/02; H04L 67/18; H04L 69/22
See application file for complete search history.

(56) References Cited

U.S. PATENT DOCUMENTS

| | | | |
|---|---|---|---|
| 7,194,723 B1 | 3/2007 | Hwang et al. | |
| 8,595,378 B1 * | 11/2013 | Cohn | H04L 65/4076 709/238 |
| 8,958,293 B1 * | 2/2015 | Anderson | H04L 67/1002 370/230 |
| 9,727,363 B2 | 8/2017 | Wang | |

(Continued)

OTHER PUBLICATIONS

"Create a Service Blueprint", Retrieved on Sep. 29, 2016. pp. 2.

(Continued)

*Primary Examiner* — Austin J Moreau
(74) *Attorney, Agent, or Firm* — SU IP Consulting

(57) ABSTRACT

Example methods are provided for a host to perform traffic optimization for a multi-node application in a virtualized computing environment. The method may comprise: detecting, from the first virtualized computing instance supported by the host, a packet that includes header information identifying the second virtualized computing instance as a destination; and identifying that the first virtualized computing instance and second virtualized computing instance are configured to perform respective first role and second role to implement the multi-node application. The method may also comprise: based on one or more optimization factors, selecting the third virtualized computing instance that is also configured to perform the second role to replace the second virtualized computing instance; modifying the header information of the packet to identify the third virtualized computing instance as the destination; and sending the packet with modified header information to the third virtualized computing instance.

21 Claims, 7 Drawing Sheets

(56) References Cited

U.S. PATENT DOCUMENTS

| | | | |
|---|---|---|---|
| 2009/0313311 A1 | 12/2009 | Hoffmann et al. | |
| 2010/0223397 A1* | 9/2010 | Elzur | H04L 49/15 |
| | | | 709/235 |
| 2014/0222745 A1 | 8/2014 | Deng et al. | |
| 2016/0092252 A1 | 3/2016 | Wagner | |
| 2016/0103699 A1 | 4/2016 | Thakkar et al. | |
| 2016/0246636 A1 | 8/2016 | Tsirkin | |
| 2016/0277299 A1 | 9/2016 | Kadaba et al. | |
| 2017/0185563 A1 | 6/2017 | Underwood et al. | |
| 2018/0102943 A1 | 4/2018 | Movsisyan | |
| 2018/0159775 A1* | 6/2018 | Agarwal | H04L 47/125 |
| 2018/0268302 A1* | 9/2018 | Tosh | G06N 5/04 |

OTHER PUBLICATIONS

"VMware vRealize Log Insight—Automated Log Management for Hybrid Cloud Environments", Datasheet, pp. 2.

"VMware vRealize Operations—Intelligent Operations from Applications to Storage—from vSphere and Hyper-V to Amazon Web Service and Physical Hardware", Datasheet, Retrieved on Nov. 27, 2018 from <URL:https://www.vmware.com/content/dam/digitalmarketing/vmware/en/pdf/products/vcenter/vmware-vrealize-operations-datasheet.pdf>, pp. 2.

"VMware vRealize Network Insight", Intelligent operations for networking and security for physical, virtual and cloud environments, pp. 2.

\* cited by examiner

TRAFFIC OPTIMIZATION FOR MULTI-NODE APPLICATIONS

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. Multi-node applications may be implemented in the virtualized computing environment using multiple network nodes to provide a wide variety of services, such as web applications, back office services, document management, etc. Multi-node applications may range from simple websites with a handful of nodes to more complex structure with hundreds or thousands of nodes. In practice, however, it may be challenging to implement the multi-node applications in an efficient manner.

DETAILED DESCRIPTION

Figure 1:
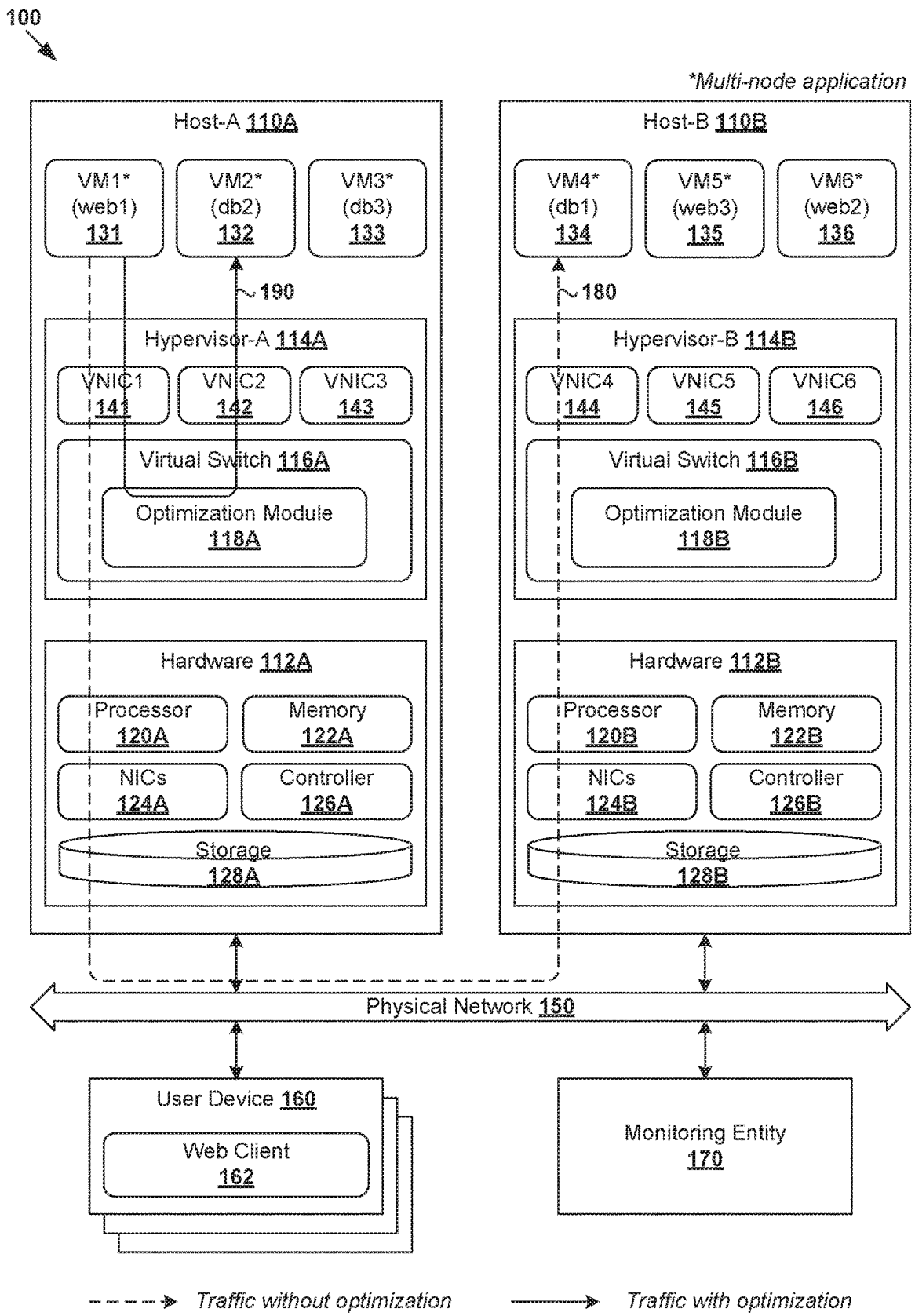
FIG. 1 is a schematic diagram illustrating an example virtualized computing environment in which traffic optimization for a multi-node application may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to the implementation of multi-node applications will now be explained in more detail using FIG. 1, which is a schematic diagram illustrating example virtualized computing environment 100 in which traffic optimization for a multi-node application may be performed. It should be understood that, depending on the desired implementation, virtualized computing environment 100 may include additional and/or alternative components than that shown in FIG. 1.

In the example in FIG. 1, virtualized computing environment 100 includes multiple hosts, such as host-A 110A and host-B 110B that are inter-connected via physical network 150. Each host 110A/110B includes suitable hardware 112A/112B and virtualization software (e.g., hypervisor-A 114A and hypervisor-B 114B) to support various virtual machines. For example, host-A 110A supports VM1 131, VM2 132 and VM3 133, while host-B 110B supports VM4 134, VM5 135 and VM6 136. In practice, virtualized computing environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines 131-136, it should be understood that a "virtual machine" running on host 110A/110B is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, etc. The virtual machines may also be complete computational environments, containing virtual equivalents of the hardware and software components of a physical computing system. The term "hypervisor" may refer generally to a software layer or component that supports the execution of multiple virtualized computing instances, including system-level software that supports namespace containers such as Docker, etc.

Hypervisor 114A/114B maintains a mapping between underlying hardware 112A/112B and virtual resources allocated to virtual machines 131-136. Hardware 112A/112B includes suitable physical components, such as central processing unit(s) (CPU(s)) or processor(s) 120A/120B; memory 122A/122B; physical network interface controllers (NICs) 124A/124B; and storage disk(s) 128A/128B accessible via storage controller(s) 126A/126B, etc. Virtual resources are allocated to each virtual machine to support a guest operating system (OS) and applications. Corresponding to hardware 112A/112B, the virtual resources may include virtual CPU, virtual memory, virtual disk, virtual network interface controller (VNIC), etc.

Hardware resources may be emulated using virtual machine monitors (VMMs). For example in FIG. 1, VNIC1 141, VNIC2 142, VNIC3 143, VNIC4 144, VNIC5 145 and VNIC6 146 are emulated using respective VMMs (not shown for simplicity). Hypervisor 114A/114B implements virtual switch 116A/116B to handle both egress packets (i.e., outgoing or outbound) from, and ingress packets (i.e., incoming or inbound) to, virtual machines 131-136. Each virtual switch 116A/116B generally represents a logical collection of virtual ports that are each logically associated with a VNIC. Throughout the present disclosure, the term "packet" may refer generally to a group of bits that can be transported together from a source to a destination, such as message, segment, datagram, etc.

Virtual machines 131-136 may be deployed as network nodes to implement a logical multi-node application whose functionality is distributed over the network nodes. In the example in FIG. 1, VM1 131 ("web1"), VM5 135 ("web3") and VM6 136 ("web2") form a group of web servers, while VM2 132 ("db2"), VM3 133 ("db3") and VM4 134 ("db1") form a group of database servers. The web servers (e.g., located on first subnet=10.1.10/24) may be responsible for processing requests from web clients 162 running on respective user devices 160, such as Hypertext Transfer Protocol (HTTP) requests to access web content, etc. The database servers (e.g., located on second subnet=10.1.20/24) may be responsible for providing database services to web servers to query or manipulate data stored in a database.

Conventionally, traffic from one network node to another network node of a multi-node application (i.e., intra-application traffic) may not be handled efficiently. For example in FIG. 1, when web server VM1 131 requires data from a database, VM1 131 may access one of the database servers randomly. Another conventional approach is to distribute the traffic across the database servers in a round robin manner. In this case, a first query may be sent to VM2 132, a second query to VM3 133 and a third query VM4 134 before looping back to VM2 132. Although relatively straightforward and inexpensive to implement, these conventional approaches do not result in the most efficient traffic distribution because they treat all database servers as equal options. For example in FIG. 1, VM4 134 may be accessed by VM1 131 in a random or round robin manner, even though it is more efficient to access VM2 132 or VM3 133. In this case, the overall performance of the multi-node application might be adversely affected, and resources might be unnecessarily wasted to forward the traffic from VM1 131 at host-A 110A to VM4 134 at host-B 110B.

Traffic Optimization

According to examples of the present disclosure, traffic optimization may be performed to improve the performance of a multi-node application and efficiency of resource utilization in virtualized computing environment 100. In particular, by leveraging the knowledge of the roles performed by respective network nodes implementing the multi-node application, traffic optimization may be performed to replace a sub-optimal traffic path from VM1 131 to VM4 134 (see dotted line 180 in FIG. 1) with a replacement traffic path from VM1 131 to VM2 132 (see full line 190 in FIG. 1). The replacement traffic path may be considered "better performing" or "optimal" based on one or more optimization factors used during traffic optimization.

Figure 2:
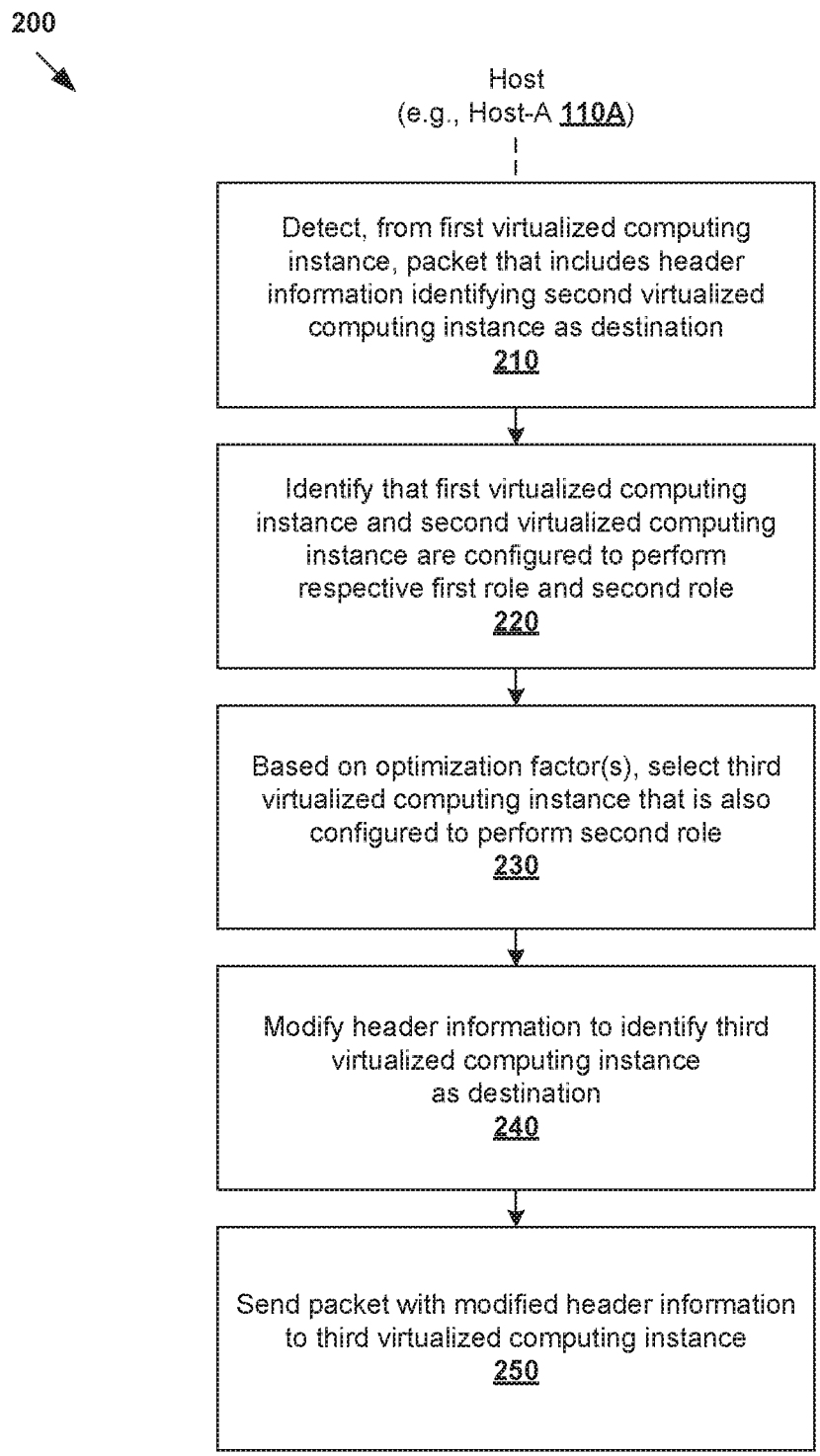
FIG. 2 is a flowchart of an example process for a host to perform traffic optimization for a multi-node application.

In more detail, FIG. 2 is a flowchart of example process 200 for a host to perform traffic optimization for a multi-node application. Example process 200 may include one or more operations, functions, or actions illustrated by one or more blocks, such as 210 to 250. The various blocks may be combined into fewer blocks, divided into additional blocks, and/or eliminated depending on the desired implementation. Example process 200 may be implemented by host 110A/110B, such as using optimization module 118A/118B implemented by virtual switch 116A/116B at hypervisor 114A/114B, etc. In the following, example process 200 will be explained using VM1 131 as an example "first virtualized computing instance," VM4 134 as an example "second virtualized computing instance," and VM2 132 as an example "third virtualized computing instance," and host-A 110A as an example "host" performing the traffic optimization.

At 210 in FIG. 2, host-A 110A detects, from source VM1 131, a packet that includes header information identifying VM4 134 on host-B 110B as a destination. For example, the packet may be sent for VM1 131 to initiate a network connection with VM4 134. At 220 in FIG. 2, host-A 110A identifies that VM1 131 is configured to perform a first role (e.g., web server), and VM4 134 to perform a second role (e.g., database server) to implement the multi-node application. At 230 in FIG. 2, based on optimization factor(s), host-A 110A selects VM2 132 that is also configured to perform the second role to replace VM4 134. At 240 in FIG. 2, the header information of the packet is modified to identify VM2 132 as the destination. At 250 in FIG. 2, the packet with the modified header information is sent to VM2 132.

It should be understood that examples of the present disclosure may be applied to any suitable roles. Here, the term "role" may refer generally to a set of functionalities performed by a network node in the context of a multi-node application. Besides the web server and database server roles shown in FIG. 1, other example roles associated with a multi-node application may include application server, email server, caching/proxy server, Domain Name System (DNS) server, a combination thereof, etc. As will be described further using FIG. 3 to FIG. 7, the first and second roles may be identified based on role mapping data obtained by host-A 110A prior to performing example process 200. Here, the term "obtain" may refer generally to host-A 110A generating the role mapping data, or receiving or acquiring the role mapping data from another source (e.g., host, virtual machine, management entity, etc.).

As will be described further using FIG. 3 to FIG. 7, any suitable optimization factors may be used. For example, a location-based optimization factor may be used to consider the physical locality of destination, and its proximity with the source. During traffic optimization, this allows host-A 110A to consider that VM1 131 and VM2 132 are located at the same location (e.g., host, rack, pod, chassis, data center, cloud) whereas VM4 134 is location at a different location to improve performance. Additionally or alternatively, performance-based optimization factor(s) associated with one or more of the following may be considered: CPU resource utilization, memory resource utilization, storage resource utilization, network resource utilization, and error performance. In this case, replacement traffic path 190 in FIG. 1 may be optimal in terms of efficient resource utilization and error minimization or avoidance. The performance-based optimization factor(s) may be assessed based on simple or meta/compound metrics.

In the following, various examples will be described using FIG. 3 to FIG. 7. In particular, a detailed process for traffic optimization will be explained using FIG. 3, a first example using FIG. 4 and FIG. 5, and a second example using FIG. 6 and FIG. 7.

Role Identification

Figure 3:
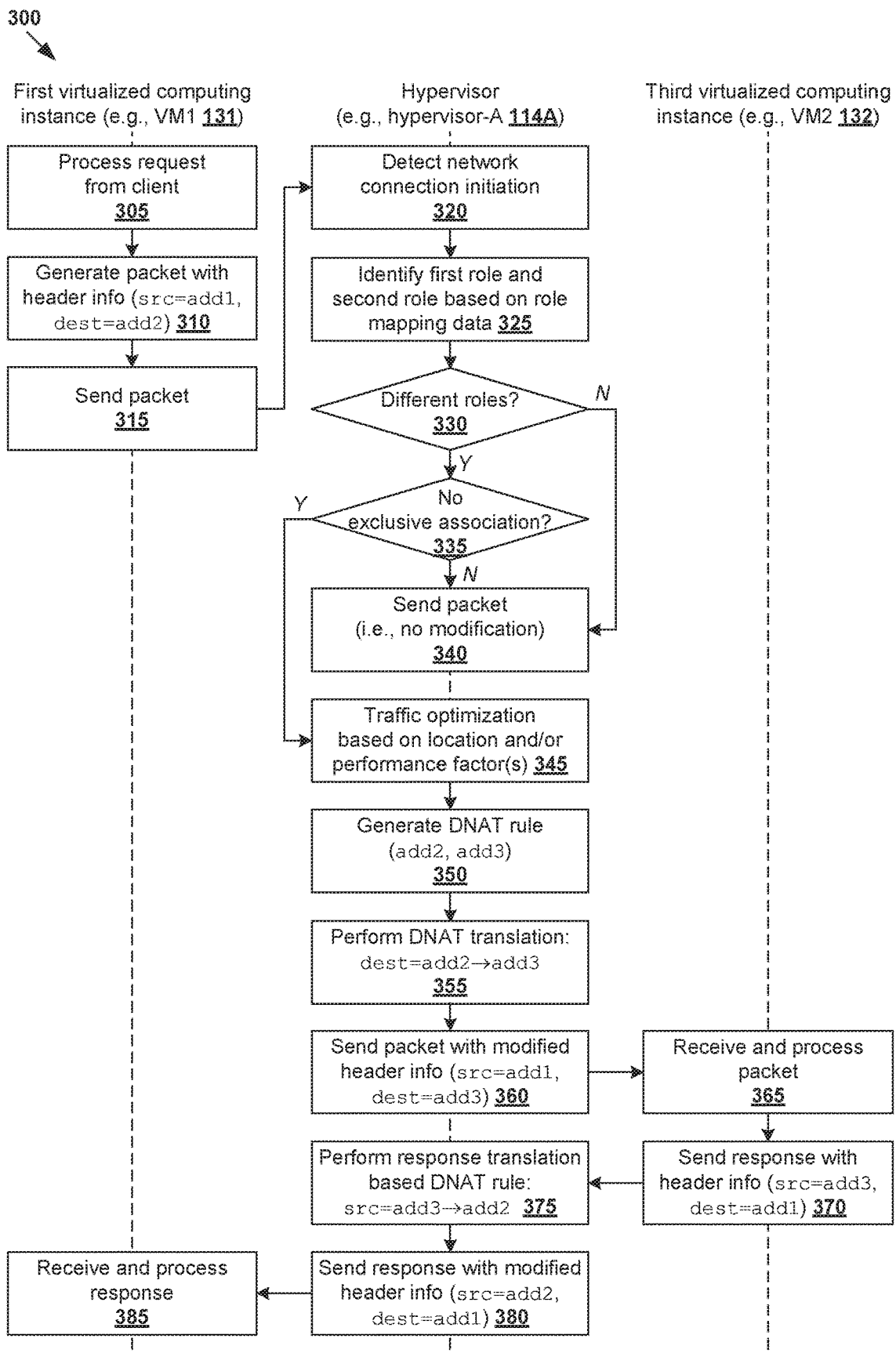
FIG. 3 is a flowchart of an example detailed process for a host to traffic optimization for a multi-node application.

FIG. 3 is a flowchart of example detailed process 300 for a host to perform traffic optimization for a multi-node application. Example process 300 may include one or more operations, functions, or actions illustrated by one or more blocks, such as 305 to 385. The various blocks may be combined into fewer blocks, divided into additional blocks, and/or eliminated depending on the desired implementation. In the following, host-A 110A may implement example process 300 (see blocks 320-360 and 375-380) using hypervisor 114A (e.g., optimization module 118A at virtual switch 116A). The example in FIG. 3 will be explained using FIG. 4, which is a schematic diagram illustrating first example 400 of a host performing traffic optimization for a multi-node application according to the example in FIG. 3.

Referring first to 305 in FIG. 3, VM1 131 receives and processes a request message received from web client 162 running on user device 160. One example of a request message is a HTTP request. According to a request-response model, VM1 131 may process the HTTP request and send a HTTP response to web client 162. At 310 and 315 in FIG. 3, in response to determination that database access, VM1 131 initiates a connection with a database server by generating and sending a packet to the database server.

As discussed using FIG. 1, VM1 131 may use round-robin approach to connect to one of VM2 132, VM3 133 and VM4 134. In the example in FIG. 4, VM1 131 sends packet 410 to VM4 134 to initiate the connection. Packet 410 includes header information identifying source=IP1 associated with VM1 131 and destination=IP4 associated with VM4 134. (Note that the source is represented using first network address="add1," and destination using second network address="add2" at block 310 in FIG. 3.) Depending on the desired implementation in practice, packet 410 may represent a HTTP request, structured query language (SQL) query, etc.

At 320 in FIG. 3, based on the header information of packet 410 from VM1 131, hypervisor-A 114A detects a network connection initiation between source=IP1 and destination=IP4. At 325 in FIG. 3, hypervisor-A 114A identifies that the respective roles of source VM1 131 and destination VM4 134, such as based on role mapping data 420 that is obtained prior to detecting packet 410.

In one example, host-A 110A may obtain role mapping data 420 by generating role mapping data 420 locally. Alternatively, role mapping data 420 may be received or acquired from another host (e.g., host-B 110B), a management entity, or any other source. Examples of a "management entity" capable of generating role mapping data 420 include a management server (e.g., VMware vCenter®) that provides infrastructure manager services, a network management entity that provides software-defined network (SDN) management services (e.g., VMware NSX®), monitoring entity 170 that provides monitoring services (to be discussed further below; e.g., VMware vRealize Operations Manager®), a combination thereof, etc. The management entity may be implemented using one or more virtual entities, physical entities, etc.

Role mapping data 420 may be generated using any suitable approach. An example approach is described in related U.S. patent application Ser. No. 15/287,799 filed Oct. 7, 2016, the entirety of which is herein incorporated by reference. In this example, role mapping data 420 may be determined using log data describing events relating to network nodes (e.g., virtual machines 131-136) implementing the multi-node application, network flow data describing flow of data among the network nodes, etc. Analysis may be performed on the log data to identify a role performed by a particular network node, and the network flow data to identify a relationship between multiple network nodes. For example, the log data may include hardware and/or software events, such as inputs/outputs, user actions, success/failure, errors, etc. The network flow data may describe the amount of incoming/outgoing traffic per node or service, flow patterns, source and destination information, routing details, etc. In practice, some nodes may be capable of performing multiple roles, such as both mail server and database server, etc.

Figure 4:
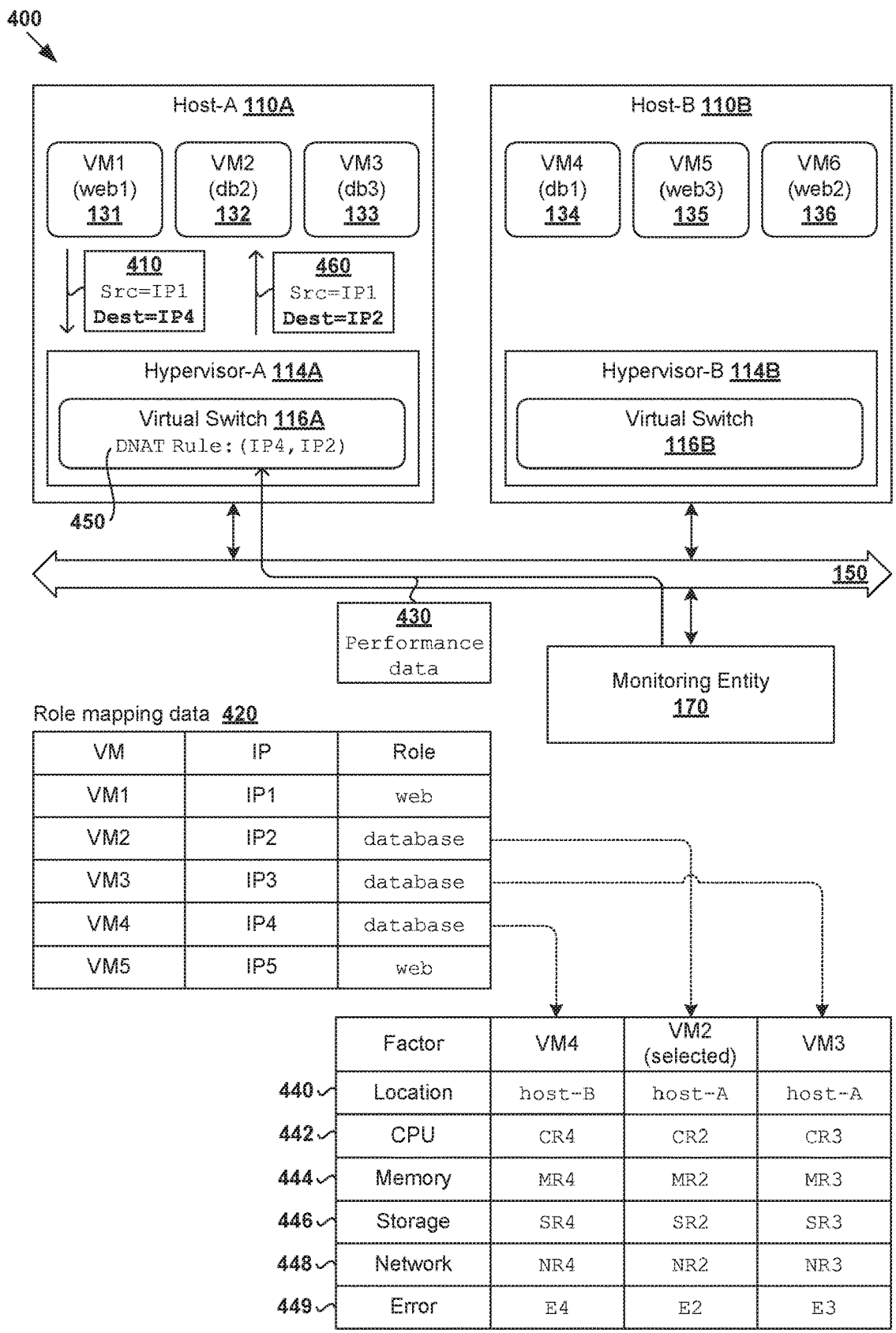
FIG. 4 is a schematic diagram illustrating a first example of a host performing traffic optimization for a multi-node application according to the example in FIG. 3.

In the example in FIG. 4, role mapping data 420 associates VM1 131, VM5 135 and VM6 136 with role=web server, and VM2 132, VM3 133 and VM4 134 with role=database server. Note that virtual machines 131-136 may be identified using their respective IP addresses, universally unique identifiers (UUIDs), or any other suitable IDs. Based on role mapping data 420, source VM1 131 is identified to be associated with first role=web server, and destination VM4 134 with second role=database server. It should be understood that role mapping data 420 may be dynamically updated, such as when role changes is detected, new roles are created, existing roles removed, etc. For example in FIG. 4, the role of VM6 136 may be updated from web server to mail server using any suitable dynamic role identification approach.

Optimization Factors

Once the roles are identified, hypervisor-A 114A checks several conditions to determine whether traffic optimization may be performed. At 330 in FIG. 3, a first condition involves determining whether the source and destination are configured to perform different roles. At 335 in FIG. 3, a second condition involves determining whether the source and destination are exclusively associated with each other.

The first condition ensures that the traffic optimization process does not interfere with operations that require communication between a pair of network nodes performing the same role, such as synchronization operations (e.g., one web server synchronizing data or state with another web server), high-availability operations (e.g., interaction between a pair of web servers with a primary-secondary configuration), etc. The second condition ensures that the traffic optimization process does not interfere with configuration (e.g., by a network administrator) that exclusively pins VM1 131 to VM4 134, in which case it is not necessary to consider other options.

At 340 in FIG. 3, in response to determination that the source and destination are either configured to perform the same role (i.e., first condition not satisfied) or have exclusive association (i.e., second condition not satisfied), packet 410 is sent without performing any traffic optimization. Otherwise (i.e., source and destination are configured to perform different roles and do not have exclusive association), traffic optimization may be performed as follows.

At 345 in FIG. 3, a destination is selected from candidates that are also configured to perform second role=database server, i.e., the same role as destination=VM4 134 in packet 410. The selection may be based on location-based and/or performance-based optimization factors.

Location-based optimization factor(s) may be used to consider the physical locality of the source and destination, and their proximity with each other. In this case, the selection at 345 involves analyzing location data obtained from a management entity (e.g., infrastructure services manager) to determine whether the source and destination are located in the same location. Here, the same location may refer generally to the same host, rack, pod, chassis, data center, cloud, etc. For example, a chassis may refer to an enclosure in which one or more hosts are mounted (depending on the vendor's specification). A rack (e.g., server rack) may include one or more chassis stacked to make efficient use of space and position within a pod. A pod may be a modular unit of data center with a set of resources or infrastructure to service one or more racks. A data center at a particular site may be a collection of hosts housed in one or more pods, racks and chassis. Any other suitable definition may be used.

Performance-based optimization factors may be used to compare the candidates based on their performance (within acceptable ranges). In this case, the selection at 345 involves obtaining and analyzing performance data 430 that is dynamically collected using monitoring entity 170 capable of collecting metrics relating to hosts, virtual machines, and other related entities in virtualized computing environment 100. Examples of monitoring entity 170 include vRealize Operations™, vRealize Network Insight™ and vRealize Log Insight™ (available from VMware, Inc.), any combination thereof, etc.

In practice, performance data 430 may include primitive or meta/compound metrics. Example primitive metrics include CPU/memory/storage properties and usage (e.g., collected using vRealize Operations, etc.), network properties and usage (e.g., collected using vRealize Network Insight, etc.), error performance data (e.g., error events and event types collected using vRealize Log Insight, etc.), any combination thereof, etc. Meta/compound metrics may be related to the load at virtual machines 131-136, such as based on CPU/memory/storage/network resource utlization when compared to acceptable ranges (to be discussed below).

In the example in FIG. 4, performance data 430 may include metrics associated with virtual machines 131-136, host-A 110A and host-B 110B. For example, CPU-related metrics for a virtual machine may include CPU time spent waiting for input/output (I/O), wait time, overall CPU contention, CPU reservation used, CPU effective limit, percentage time that the CPU is idle, percentage of I/O wait time, etc. For a host, its CPU-related metrics may include average CPU usage, percentage of CPU demand, percentage of CPU contention, number of CPU sockets, reserved capacity, total capacity, etc. Performance data 430 may also include metrics associated with other virtual and/or physical entities in virtualized computing environment 100, such as layer-2 switches and layer-3 routers located on physical network 150, firewalls, resource pools, data centers, storage pods, distributed virtual switches, etc.

Some general performance-based factors associated with CPU resource utilization (see 442), memory resource utilization (see 444), storage resource utilization (see 446), network resource utilization (see 448) and error performance (see 449) are shown in FIG. 4. VM4 134 is associated with metrics (CR4, MR4, SR4, NR4, E4), VM2 132 with (CR2, MR2, SR2, NR2, E2) and VM3 133 with (CR3, MR3, SR3, NR3, E3). The selection process may involve comparing each set of metrics against respective acceptable ranges, such as (CR_min, CR_max) for CPU resource utilization, (MR_min, MR_max) for memory resource utilization, (SR_min, SR_max) for storage resource utilization, (NR_min, NR_max) for network resource utilization, and (E_min, E_max) for error performance.

In one example, assuming VM2 132, VM3 133 and VM4 134 all have performance metrics that are within the acceptable ranges above, location-based factor (see 440) may be used to give preference to VM2 132 and VM3 133 on the same host-A 110A as VM1 131. For example, a local destination may be preferred from the perspective of VM1 131 to reduce packet latency and avoid the necessary processing required to send packet 410 via physical NIC 124A and physical network 150 to reach VM4 134 on another host-B 110B. Based on performance-based factors 442-449 associated with VM2 132 and VM3 133, VM2 132 may then be selected as the "best" destination, in that it is the nearest destination to VM1 131 with the best performance (in terms of resource usage and error minimization or avoidance) within acceptable ranges.

As the performance and location of a network node may change over time (e.g., due to migration, load, hardware/software issues), traffic optimization according to examples of the present disclosure may be performed to dynamically/periodically select the "best" destination at a particular time. In some cases, the original destination of packet 410 may be maintained if other candidates do not offer any improvement in terms of resource usage, error performance, etc. Although not shown in FIG. 4 for simplicity, compound metrics (as explained above) or weighted values may be used to compare the performance of the candidates.

Destination Network Address Translation

Referring to FIG. 3 again, at 350, host-A 110A generates and stores a destination network address translation (DNAT) rule=(IP4, IP2), where IP4 is the network address of VM4 134 (i.e., original destination) and IP2 is the network address of VM2 132 (i.e., new destination selected at 345 in FIG. 3).

At 355 in FIG. 3, DNAT is performed by modifying the header information of packet 410 to identify VM2 132 as the new destination. For example in FIG. 4, based on DNAT rule 450, destination network address=IP4 of VM4 134 in packet 410 is replaced with IP2 of VM2 132. (Note that the new destination address is represented using third network address "add3" at block 355 in FIG. 3.) At 360 in FIG. 3, the resulting packet 460 with the modified header information is sent to VM2 132 via virtual switch 116A (without requiring transmission over physical network 150 compared to original destination VM4 134).

Figure 5:
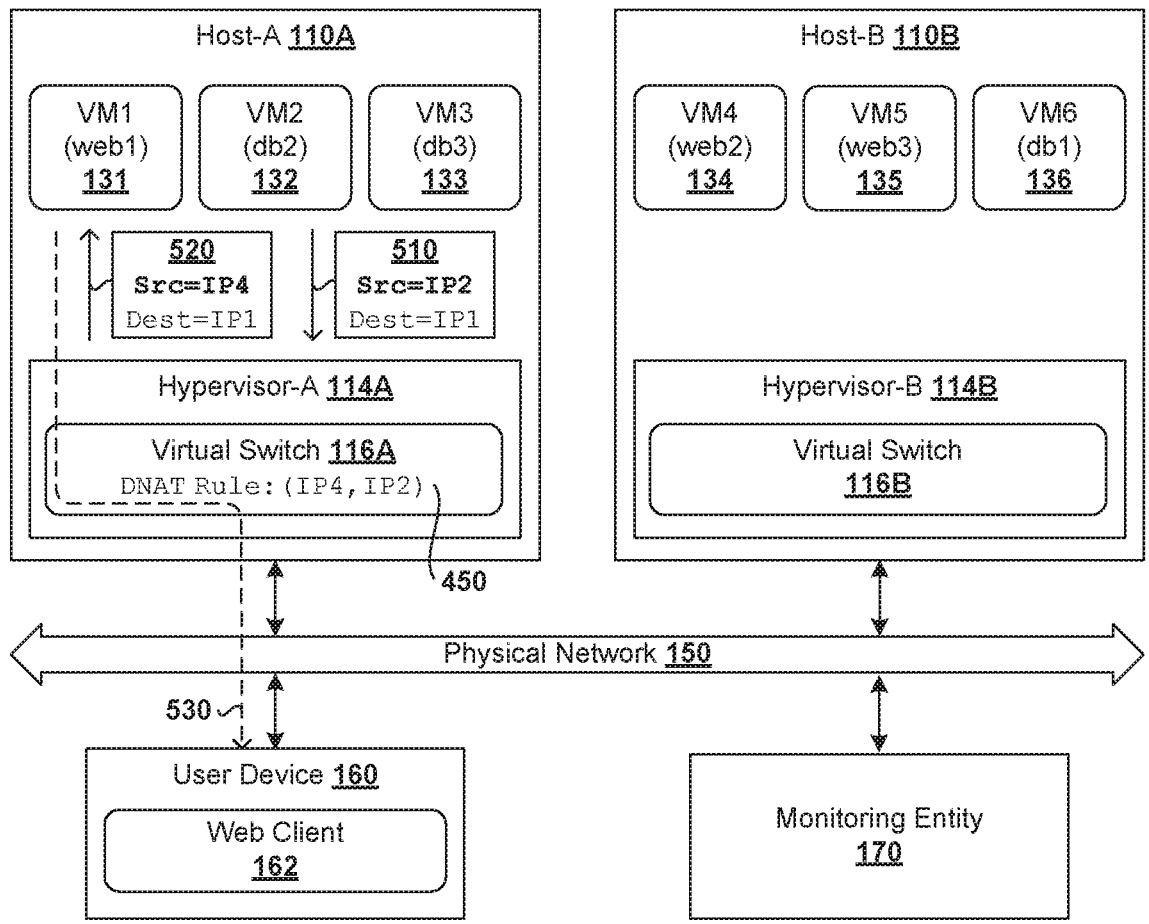
FIG. 5 is a schematic diagram illustrating a first example of a host performing response translation according to a destination network address translation (DNAT) rule generated in the example in FIG. 4.

The reverse translation logic of the DNAT process may be performed on response packet(s) received from VM2 132. An example is illustrated in FIG. 5, which is a schematic diagram illustrating a first example 500 of a host performing response translation according to DNAT rule 450 generated in the example in FIG. 4. According to 365 and 370 in FIG. 3, in response to receiving and processing packet 410, VM2 132 replies with response packet 510 that includes header information identifying source=VM2 132 and destination=VM1 131. Depending on the type of packet 410, response packet 510 may be a part of HTTP response, SQL response, etc.

At 375 in FIG. 3, response translation is performed on response packet 510 according to DNAT rule 450 by replacing source network address=IP2 of VM2 132 with IP4 of VM4 134. The resulting response packet with modified header information is shown at 520 in FIG. 5. At 380 in FIG. 3, response packet 520 with modified header information is sent to VM1 131. At 385 in FIG. 3, VM1 131 may process response packet 520 and subsequently respond to the web client 162 (see 530 in FIG. 3).

Figure 6:
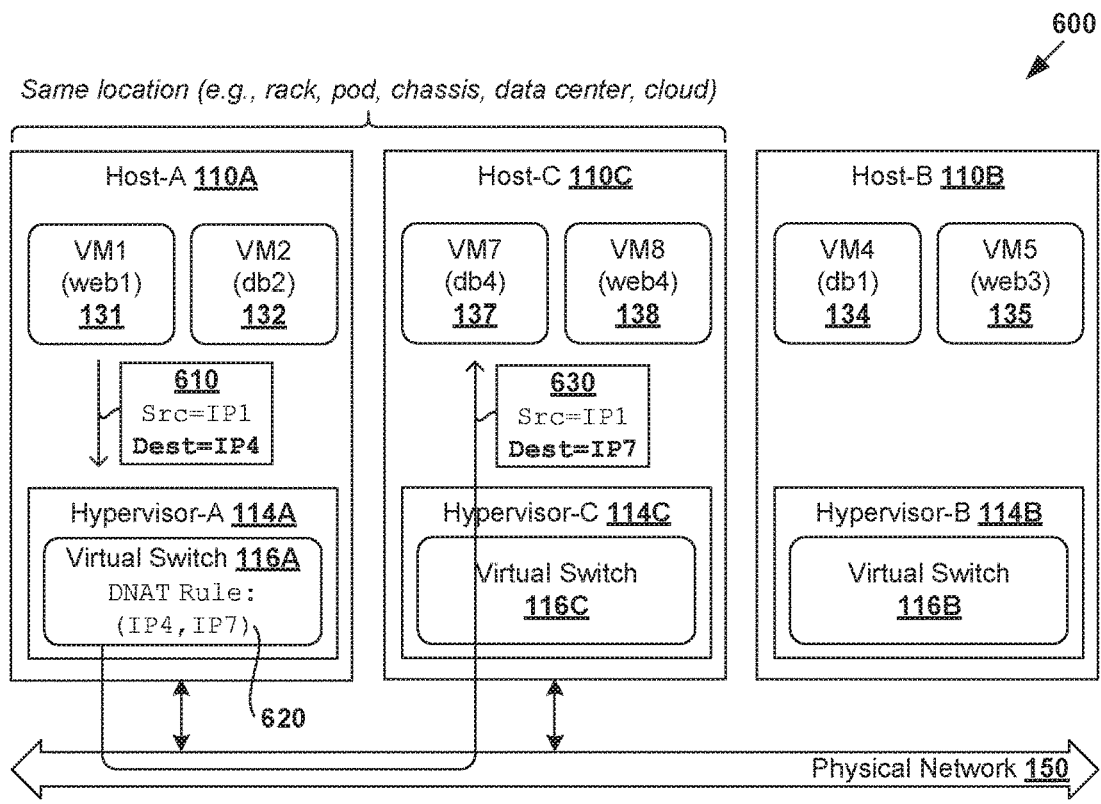
FIG. 6 is a schematic diagram illustrating a second example of a host performing traffic optimization for a multi-node application according to the example in FIG. 3.

Another example of traffic optimization is shown in FIG. 6, which is a schematic diagram illustrating second example 600 of a host performing traffic optimization for a multi-node application according to the example in FIG. 3. In this case, virtualized computing environment 100 further includes host-C 110C that supports VM7 137 associated with role=database server ("db4") and VM8 138 associated with role=web server ("web4"). Similar to host-A 110A and host-B 110B, host-C 110C includes any suitable hardware components and hypervisor-C 114C that implements virtual switch 116A and an optimization module (not all components of host-C 110C are shown in FIG. 6 for simplicity).

Similar to the example in FIG. 4, traffic optimization is performed at host-A 110A when a network connection initiation is detected. In this case, packet 610 includes header information with source network address=IP1 of VM1 131 and destination network address=IP4 of VM4 134. According to 320 to 345 in FIG. 3, VM7 137 may be dynamically selected to replace VM4 134 as the destination based on location-based and/or performance-based optimization factors.

Based on role mapping data 615, source VM1 131 with IP address=IP1 is identified to be associated with first role=web server, and destination VM4 134 with IP address=IP4 associated with second role=database server. Further, based on role mapping data 615, VM2 132, VM4 134 and VM7 137 are all associated with role=database server, one of which may be selected based on any suitable optimization factor(s).

In the example in FIG. 6, VM7 137 may be selected for various reasons. For example, VM2 132 and VM7 137 may be preferred because VM4 134 is at a different location (e.g., rack, pod, chassis, data center, cloud) compared to source VM1 131. As indicated at 640 in FIG. 6, both VM2 132 and VM7 137 are located in the same pod-A as VM1 131, while VM3 134 is in another pod-B. Although VM2 132 resides on the same host as VM1 131, VM2 132 may be overloaded. In this case, VM7 137 may be selected for better performance in terms of resource utilization (e.g., in terms of CPU 642, memory 644, storage 646, network 648), error performance 649 (e.g., minimization or avoidance of error events), a combination thereof, etc. VM7 137 may represent the nearest destination with the best performance within acceptable ranges discussed using FIG. 4 and FIG. 5.

Once the new destination is selected, DNAT rule=(IP4, IP7) is generated and stored (see 620 in FIG. 6). DNAT is performed on packet 610 by replacing destination network address=IP4 of VM4 134 with IP7 of VM7 137. The resulting packet 630 with modified header information is sent over physical network 150 to reach VM7 137 on host-C 110C.

Figure 7:
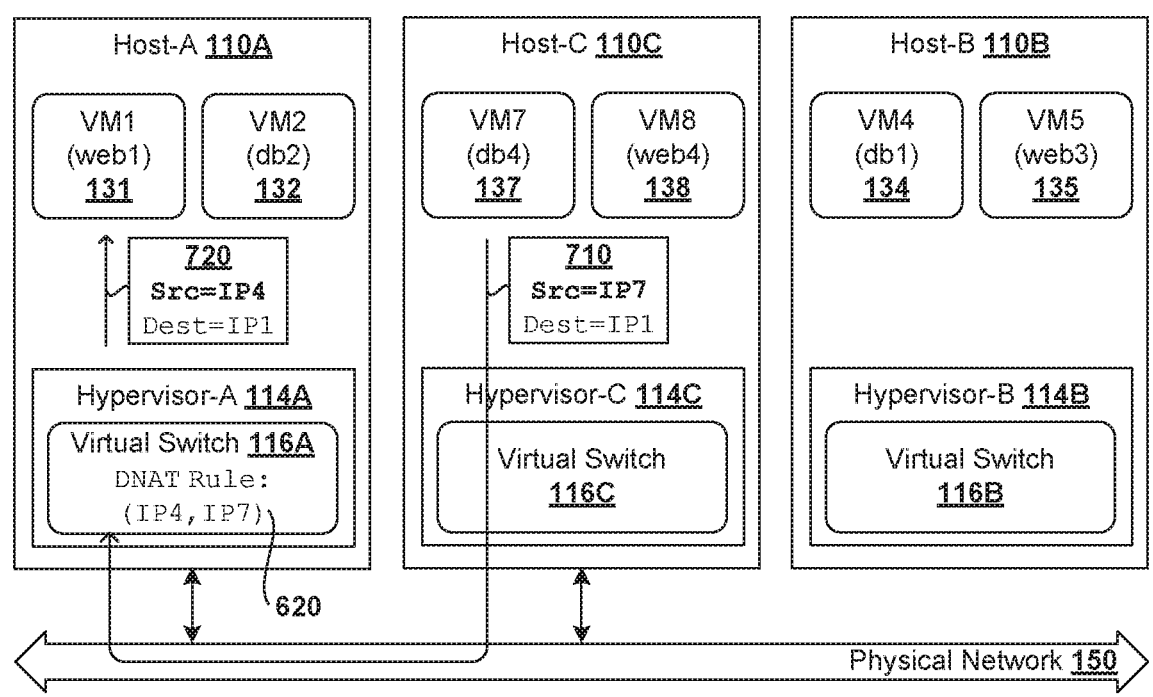
FIG. 7 is a schematic diagram illustrating a second example of a host performing response translation according to a DNAT rule generated in the example in FIG. 6.

The reverse translation logic of the DNAT process may be performed on response packet(s) from VM7 137. An example is illustrated in FIG. 7, which is a schematic diagram illustrating a second example 700 of a host performing response translation according to DNAT rule 620 generated in the example in FIG. 6. In this case, response packet 710 includes header information identifying source network address=IP7 of VM7 137 and destination network address=IP1 of VM1 131. Response translation is performed based on DNAT rule (IP4, IP7) by replacing source network address=IP7 with IP4, which is the original destination of packet 610 from VM1 131 in FIG. 6. The resulting response packet 720 with the modified header information is then sent to VM1 131.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as host 110A/110B/110C may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

I claim:

1. A method for a host to perform traffic optimization for a multi-node application implemented in a virtualized computing environment, wherein the method comprises:

detecting, by a hypervisor, from a first virtualized computing instance supported by the host, a packet that includes header information identifying a second virtualized computing instance as a destination, wherein functionalities of the multi-node application are distributed over at least first virtualized computing instance, the second virtualized computing instance, and a third virtualized computing instance as network nodes;

prior to sending, by the hypervisor, the packet to the second virtualized computing instance with the header information of the packet;

identifying, by the hypervisor, that the first virtualized computing instance and the second virtualized computing instance are configured to perform respective first role and second role to implement the multi-node application;

based on one or more optimization factors, selecting, by the hypervisor, the third virtualized computing instance that is also configured to perform the second role to replace the second virtualized computing instance;

modifying, by the hypervisor, the header information of the packet to identify the third virtualized computing instance as the destination; and sending, by the hypervisor, the packet with modified header information to the third virtualized computing instance.

2. The method of claim 1, wherein selecting the third virtualized computing instance comprises:

based on a location-based optimization factor, determining that the first virtualized computing instance and third virtualized computing instance are both associated with a first location and the second virtualized computing instance is associated with a second location, wherein the first location and second location represent different hosts, racks, pods, chassis, data centers, or clouds.

3. The method of claim 1, wherein selecting the third virtualized computing instance comprises:

selecting the third virtualized computing instance based on performance-based optimization factors associated with one or more of the following: central processing unit (CPU) resource utilization, memory resource utilization, storage resource utilization, network resource utilization, and error performance.

4. The method of claim 1, wherein the method further comprises:

prior to selecting the third virtualized computing instance, determining that the first virtualized computing instance is not exclusively associated with the second virtualized computing instance.

5. The method of claim 1, wherein the method further comprises:

prior to detecting the packet, obtaining role mapping data that associates the first virtualized computing instance with the first role, and the second virtualized computing instance and third virtualized computing instance with the second role.

6. The method of claim 1, wherein modifying the header information comprises:

generating a network address translation (DNAT) rule that associates a second network address of the second virtualized computing instance with a third network address of the third virtualized computing instance; and based on the DNAT rule, replacing the second network address in the header information with the third network address such that the packet is addressed from a first network address of the first virtualized computing instance to the third network address.

7. The method of claim 6, wherein the method further comprises:

detecting a response packet addressed from the third network address to the first network address;

based on the DNAT rule, modifying header information of the response packet by replacing the third network address with the second network address; and sending the response packet with the modified header information to the first virtualized computing instance.

8. A non-transitory computer-readable storage medium that includes a set of instructions which, in response to execution by a processor of a host, cause the processor to perform a method of traffic optimization for a multi-node application implemented in a virtualized computing environment, wherein the method comprises:

detecting, by a hypervisor, from a first virtualized computing instance supported by the host, a packet that includes header information identifying a second virtualized computing instance as a destination, wherein functionalities of the multi-node application are distributed over at least first virtualized computing instance, the second virtualized computing instance, and a third virtualized computing instance as network nodes;

prior to sending, by the hypervisor, the packet to the second virtualized computing instance with the header information of the packet;

identifying, by the hypervisor, that the first virtualized computing instance and the second virtualized computing instance are configured to perform respective first role and second role to implement the multi-node application;

based on one or more optimization factors, selecting, by the hypervisor, the third virtualized computing instance that is also configured to perform the second role to replace the second virtualized computing instance;

modifying, by the hypervisor, the header information of the packet to identify the third virtualized computing instance as the destination; and sending, by the hypervisor, the packet with modified header information to the third virtualized computing instance.

9. The non-transitory computer-readable storage medium of claim 8, wherein selecting the third virtualized computing instance comprises:

based on a location-based optimization factor, determining that the first virtualized computing instance and third virtualized computing instance are both associated with a first location and the second virtualized computing instance is associated with a second location, wherein the first location and second location represent different hosts, racks, pods, chassis, data centers, or clouds.

10. The non-transitory computer-readable storage medium of claim 8, wherein selecting the third virtualized computing instance comprises:

selecting the third virtualized computing instance based on performance-based optimization factors associated with one or more of the following: central processing unit (CPU) resource utilization, memory resource utilization, storage resource utilization, network resource utilization, and error performance.

11. The non-transitory computer-readable storage medium of claim 8, wherein the method further comprises:

prior to selecting the third virtualized computing instance, determining that the first virtualized computing instance is not exclusively associated with the second virtualized computing instance.

12. The non-transitory computer-readable storage medium of claim 8, wherein the method further comprises:

prior to detecting the packet, obtaining role mapping data that associates the first virtualized computing instance with the first role, and the second virtualized computing instance and third virtualized computing instance with the second role.

13. The non-transitory computer-readable storage medium of claim 8, wherein modifying the header information comprises:
generating a network address translation (DNAT) rule that associates a second network address of the second virtualized computing instance with a third network address of the third virtualized computing instance; and
based on the DNAT rule, replacing the second network address in the header information with the third network address such that the packet is addressed from a first network address of the first virtualized computing instance to the third network address.

14. The non-transitory computer-readable storage medium of claim 13, wherein the method further comprises:
detecting a response packet addressed from the third network address to the first network address;
based on the DNAT rule, modifying header information of the response packet by replacing the third network address with the second network address; and
sending the response packet with the modified header information to the first virtualized computing instance.

15. A host configured to traffic optimization for a multi-node application implemented in a virtualized computing environment, wherein the host comprises:
a processor; and
a non-transitory computer-readable medium having stored thereon instructions that, when executed by the processor, cause the processor to support the first virtualized computing instance, and perform the following:
detect, by a hypervisor, from a first virtualized computing instance, a packet that includes header information identifying a second virtualized computing instance as a destination, wherein functionalities of the multi-node application are distributed over at least first virtualized computing instance, the second virtualized computing instance, and a third virtualized computing instance as network nodes;
prior to sending, by the hypervisor, the packet to the second virtualized computing instance with the header information of the packet;
identify, by the hypervisor, that the first virtualized computing instance and the second virtualized computing instance are configured to perform respective first role and second role to implement the multi-node application;
based on one or more optimization factors, select, by the hypervisor, the third virtualized computing instance that is also configured to perform the second role to replace the second virtualized computing instance;
modify, by the hypervisor, the header information of the packet to identify the third virtualized computing instance as the destination; and
send, by the hypervisor, the packet with modified header information to the third virtualized computing instance.

16. The host of claim 15, wherein the instructions for selecting the third virtualized computing instance cause the processor to:
based on a location-based optimization factor, determine that the first virtualized computing instance and third virtualized computing instance are both associated with a first location and the second virtualized computing instance is associated with a second location, wherein the first location and second location represent different hosts, racks, pods, chassis, data centers, or clouds.

17. The host of claim 15, wherein the instructions for selecting the third virtualized computing instance cause the processor to:
select the third virtualized computing instance based on performance-based optimization factors associated with one or more of the following: central processing unit (CPU) resource utilization, memory resource utilization, storage resource utilization, network resource utilization, and error performance.

18. The host of claim 15, wherein the instructions further cause the processor to:
prior to selecting the third virtualized computing instance, determine that the first virtualized computing instance is not exclusively associated with the second virtualized computing instance.

19. The host of claim 15, wherein the instructions further cause the processor to:
prior to detecting the packet, obtain role mapping data that associates the first virtualized computing instance with the first role, and the second virtualized computing instance and third virtualized computing instance with the second role.

20. The host of claim 15, wherein the instructions for modifying the header information cause the processor to:
generate a network address translation (DNAT) rule that associates a second network address of the second virtualized computing instance with a third network address of the third virtualized computing instance; and
based on the DNAT rule, replace the second network address in the header information with the third network address such that the packet is addressed from a first network address of the first virtualized computing instance to the third network address.

21. The host of claim 20, wherein the instructions further cause the processor to:
detect a response packet addressed from the third network address to the first network address;
based on the DNAT rule, modify header information of the response packet by replacing the third network address with the second network address; and
send the response packet with the modified header information to the first virtualized computing instance.

* * * * *